United States Patent
Ding (10) Patent No.: US 12,134,040 B2
(45) Date of Patent: Nov. 5, 2024

(54) TECHNIQUES FOR OFFERING SYNERGISTIC BUNDLES IN GAMES INVOLVING GAME-SETS OF PLAY-ITEMS

(71) Applicant: Blizzard Entertainment, Inc., Irvine, CA (US)

(72) Inventor: Tian Ding, Lake Forest, CA (US)

(73) Assignee: BLIZZARD ENTERTAINMENT, INC., Irvine, CA (US)

(*) Notice: Subject to any disclaimer, the term of this patent is extended or adjusted under 35 U.S.C. 154(b) by 511 days.

(21) Appl. No.: 17/333,494

(22) Filed: May 28, 2021

(65) Prior Publication Data
US 2022/0379223 A1 Dec. 1, 2022

(51) Int. Cl.
  *A63F 13/67* (2014.01)
  *A63F 13/533* (2014.01)
  *A63F 13/798* (2014.01)

(52) U.S. Cl.
  CPC ............ *A63F 13/67* (2014.09); *A63F 13/533* (2014.09); *A63F 13/798* (2014.09); *A63F 2300/308* (2013.01); *A63F 2300/558* (2013.01); *A63F 2300/6027* (2013.01)

(58) Field of Classification Search
  CPC ...... A63F 13/67; A63F 13/533; A63F 13/798; A63F 13/60; A63F 2300/308; A63F 2300/558; A63F 2300/6027
  See application file for complete search history.

(56) References Cited

U.S. PATENT DOCUMENTS

2022/0143504 A1* 5/2022 Stine ................ A63F 13/60

OTHER PUBLICATIONS

Supports: Fire Emblem Wiki https://fireemblem.fandom.com/wiki/Support?oldid=564600#Ally_Support Nov. 17, 2020 (Year: 2020).*
Deng et al. "Personalized Bundle Recommendations in Online Games", Oct. 19, 2020 (Year: 2020).*

* cited by examiner

*Primary Examiner* — James S. McClellan
*Assistant Examiner* — Ross A Williams
(74) *Attorney, Agent, or Firm* — RAY QUINNEY & NEBEKER P.C.; John O. Carpenter (57) ABSTRACT

Techniques are described herein for automatically pre-constructing bundles of play-items based on the degree of synergy between the play-items. The degree of synergy between play-items is determined empirically, based on contents of player-constructed game-sets and outcomes of actual games using those game-sets. Automatically pre-constructing bundles involves generating pairwise synergy scores between every possible pair of play-items, and then (for bundles containing more than two items) using those pairwise synergy scores to determine bundle-wise synergy scores. Techniques are provided for identifying candidate bundle(s) of play-items to offer or award to a player. The candidate bundles are determined based on synergies between the play-items in each of the pre-constructed bundles and the play-items in the player's specific game-set.

21 Claims, 6 Drawing Sheets

$$\delta(c_i, c_j) := \delta_{i,j} = \chi(\Sigma_k \mathbb{1} > K) \cdot w_{i,j} \cdot \sum_k a^{-|t_i^{(k)} - t_j^{(k)}|}$$

- Pairwise card synergy score
- The pair only counts when it appears at least K times in sampled gameplay data
- Win rate as a factor
- A weight base that controls how much a card pair contributes as they are played on turn $t_i$ and $t_j$ respectively

REVERSED SOFT-MINIMUM AGGREGATION:

$$g(\delta_{i,j}) = n - \sum_{(i,j)\ \text{pair}} e^{-\beta \delta_{i,j}}$$

PLAY-DISTANCE COEFFICIENT FAVORS HIGH PLAY-DISTANCES

BUNDLE 508

- PLAY ITEM 574
  PLAY-COST=2
- PLAY ITEM 576
  PLAY-COST=4
- PLAY ITEM 578
  PLAY-COST=10

BUNDLE 510

- PLAY ITEM 580
  PLAY-COST=2
- PLAY ITEM 582
  PLAY-COST=3
- PLAY ITEM 584
  PLAY-COST=10

NEUTRAL PLAY-DISTANCE COEFFICIENT

BUNDLE 504

- PLAY ITEM 562
  PLAY-COST=1
- PLAY ITEM 564
  PLAY-COST=1
- PLAY ITEM 566
  PLAY-COST=2

BUNDLE 506

- PLAY ITEM 568
  PLAY-COST=1
- PLAY ITEM 570
  PLAY-COST=2
- PLAY ITEM 572
  PLAY-COST=12

PLAY-DISTANCE COEFFICIENT FAVORS LOW PLAY-DISTANCES

BUNDLE 500

- PLAY ITEM 550
  PLAY-COST=0
- PLAY ITEM 552
  PLAY-COST=2
- PLAY ITEM 554
  PLAY-COST=2

BUNDLE 502

- PLAY ITEM 556
  PLAY-COST=1
- PLAY ITEM 558
  PLAY-COST=2
- PLAY ITEM 560
  PLAY-COST=3

TECHNIQUES FOR OFFERING SYNERGISTIC BUNDLES IN GAMES INVOLVING GAME-SETS OF PLAY-ITEMS

FIELD OF THE INVENTION

The present invention relates to automated determination of bundles and, more specifically, to automated techniques for offering synergistic bundles in games involving game-sets of play-items.

BACKGROUND

In many games, players play the games using a set of play-items. The set of play-items with which a player plays a specific game is referred to herein as the player's "game-set". For some games, the play-items in each player's game-set are dictated by the game itself. For example, in chess, players can choose to play the set of black chess pieces or the set of white chess pieces. However, once the color of the set is chosen, the actual play-items in each chess player's game-set are always the same.

In other games, the play-items in each player's game-set may vary from game to game. For example, in games such as miniature war games and collectible card games, each player chooses the play-items for their respective game-set, often from a much larger play-item collection available to the player. In such games, different play-items have different "abilities" (costs, characteristics, attributes, powers, uses, limitations, etc.). Consequently, the selection of play-items to include in a game-set is considered to be a critical part of the game itself, since a player's success often hinges on the degree of synergy between the abilities of the play-items in that player's game-set.

Due to the importance of synergies between the abilities of play-items in a player's game-set, the addition of random play-items to a user's game-set is as at least as likely to decrease the user's chance of winning as it is to increase the user's chance of winning. Thus, in situations where users obtain (via rewards or otherwise) a "bundle" of play-items that they may add to their game-set, the value of the bundle largely hinges on the degree to which the play-items in the bundle have synergies with the play-items that are already part of player's game-set. A reward of random play-items may be no reward at all, and may actually lower a player's chance to win.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for automatically pre-constructing bundles of play-items based on the degree of synergy between the play-items. The degree of synergy between play-items is determined empirically, based on contents of game-sets involved in previously-played games and outcomes of those previously-played games. According to one embodiment, automatically pre-constructing bundles involves generating pairwise synergy scores between every possible pair of play-items based on sampled gameplay data, and then (for bundles containing more than 2 items) using those pairwise synergy scores to determine bundle-wise synergy scores.

In addition to techniques for pre-constructing bundles of play-items, techniques are described herein for identifying candidate bundle(s) of play-items to reward or offer a player by filtering the population of pre-constructed bundles based on synergies between the play-items in each of the pre-constructed bundles and the play-items in the player's specific game-set. Once the candidate bundles for a player are identified, the candidate bundle(s) may be automatically rewarded to the player, or the player may be allowed to select among the candidate bundles.

Pairwise Synergy Scores

According to one embodiment, the process of automatically pre-constructing bundles of play-items begins with calculating a pairwise synergy score between each pair of play-items that can legally be used in the same game-set. A high pairwise synergy score between two play-items indicates that the two play-items have abilities that complement each other. A low pairwise synergy score between two play-items indicates that the abilities of the two play-items do not complement each other.

Due to the complexity of the possible interactions between the abilities of any two play-items, it is virtually impossible to determine accurate pairwise synergy scores directly based on the abilities of the two play-items. Therefore, according to one embodiment, pairwise synergy scores are derived empirically based, at least in part, on (a) contents of game-sets involved in previously-played games, and (b) the outcome of those previously-played games.

As a general rule, the more frequently players included two play-items in their game-sets, the higher the pairwise synergy score between the play-items. In addition, as another general rule, the higher the win rate of players that included the two play-items in their game-sets, the higher the pairwise synergy score between the play-items.

Figure 1:
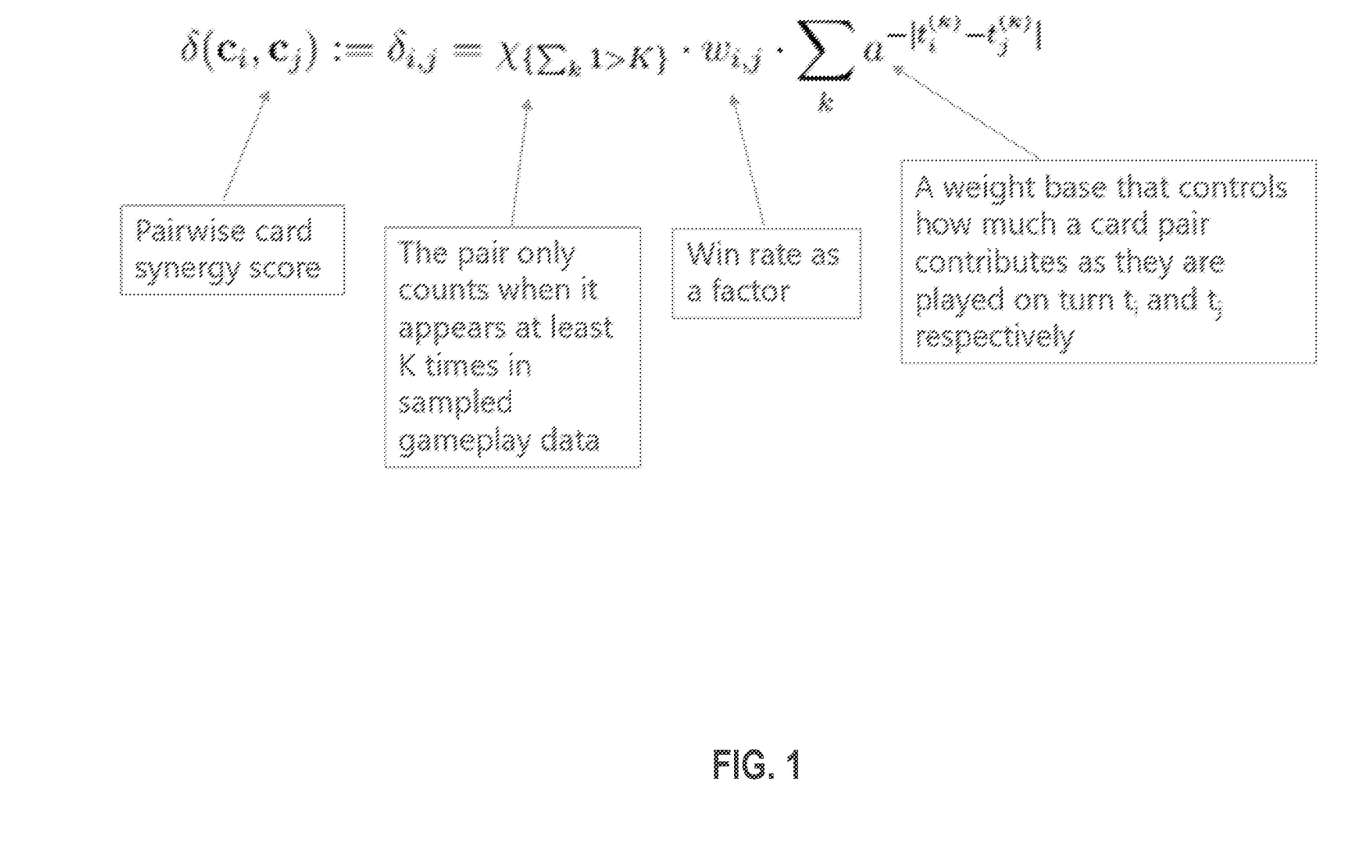
FIG. 1 illustrates a formula to calculate pairwise synergy scores, according to an embodiment.

Referring to FIG. 1, it illustrates one way to calculate pairwise synergy scores, according to an embodiment. In the illustrated example, the game for which bundles of play-items are being constructed is a turn-based card game. In this context, the play-items are cards, and a player's game-set is the deck of cards that the player uses during a game.

The pairwise synergy scores that are calculated by the formula illustrated in FIG. 1 are based on gameplay data from actual games. Specifically, the score for any given pair of cards is based on both (a) how frequently both cards in the pair were present in a player's game-set, and (b) the outcome of games in which both cards in the pair were in a player's game-set.

In one embodiment, for the purpose of calculating pairwise synergy scores, a player's game-set for a game is the set of cards in the deck used by the player in that game, whether or not those cards actually came into play during the game. In an alternative embodiment, a player's game-set for a game may be treated as only including those cards that were actually played by the player during the game. In the latter embodiment, a player's unplayed cards may be excluded from the synergy score determination on the grounds that unplayed cards are not likely to have contributed to the outcome of the game.

Figure 2:
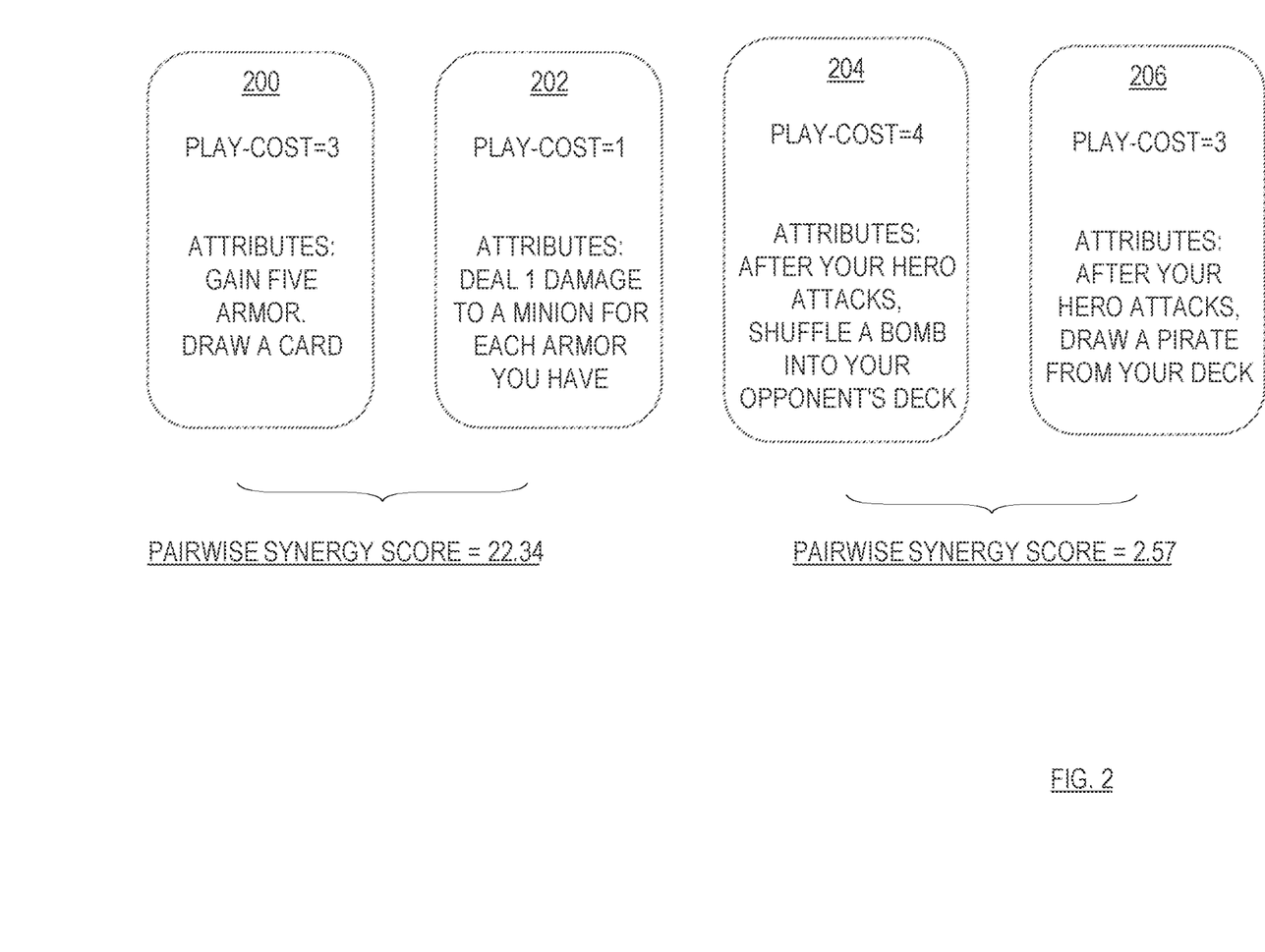
FIG. 2 is a block diagram that depicts the pairwise synergy scores for two pairs of play-items.

Referring to FIG. 2, it is a block diagram that depicts the pairwise synergy scores for two pairs of play-items. In the example given in FIG. 2, the play-items are cards used in an online collectible card game. The first pair includes cards 200 and 202, and has a pairwise synergy score of 22.34, indicating that the sampled gameplay data included a relatively high number of games with game-sets that included both cards and/or those game-sets that included both cards had a relatively high win rate. The second pair includes cards 204 and 206, and has a pairwise synergy score of 2.57, indicating that the sampled gameplay data included a relatively low number of games with game-sets that included both cards and/or those game-sets that included both cards had a relatively low win rate.

Excluding Rarely-Occurring Pairs

The pairwise synergy score of a pair of play-items is not likely to be accurate if the number of data points used to calculate the pairwise synergy is too low. For example, if pairwise synergy scores are generated based on 100,000 played games (the sampled gameplay data), but only one of those games involved a game-set that included a particular pair of play-items, then the pairwise synergy score for that pair of play-items is not likely to be accurate. Thus, according to the embodiment illustrated in FIG. 1, a pair of play-items only "counts" when the pair appears in at least K game-sets in the sampled gameplay data.

The Win-Rate Factor

As mentioned above, the pairwise synergy score for a pair of play-items is based, in part, on the win rate of game-sets that included that pair of play-items. For example, assume that the 100,0000 played games in the sampled gameplay data included 500 games in which a player used a game-set that included a particular pair of play-items. If the game-sets that included the particular pair of play-items won 400 of those 500 games, then the win rate (and therefore the pairwise synergy score) for the particular pair will be high. On the other hand, If the game-sets that included the particular pair of play-items won only 50 of those 500 games, then the win rate (and therefore the pairwise synergy score) for the particular pair will be low.

Filtering the Sampled Gameplay Data

Many online game systems use skill level calculations to rank players relative to each other, and to automatically match players with other players of similar skill levels. For games that involve low-skilled players, the outcomes of the games are more likely to be the result of player mistakes. In such cases, game outcomes may not be strongly indicative of the strength of the game-sets used by the players.

Therefore, according to one embodiment, the gameplay data is filtered prior to generating the pairwise synergy scores to exclude those games that involve inexperienced or low-skilled players. For similar reasons, an embodiment may exclude games where the difference in the skill level of the players is greater than some threshold value. For the purposes of filtering the sampled gameplay data, the skill levels of players may be determined in a variety of ways, and the techniques described herein are not limited to any particular manner of calculating skill levels.

Play-Distance Coefficient

In some games, such as chess, each game starts with all play-items in play. However, there are many games in which a player begins the game with only a subset of the player's play-items in play, or with no play-items in play at all. Games where each user begins with less than all of the user's play-items in play are often turn based. In turn-based games, each play-item may have a "play-cost" for bringing into play a play-item that is not currently in play (e.g. a card in a player's hand). In such games, the play-cost a player is able to pay usually increases as the game progresses. Consequently, low-cost play-items tend to be played early in a game, while high-cost play-items tend to show up much later in a game.

According to the embodiment illustrated in FIG. 1, the pairwise synergy score calculation has a "play-distance coefficient" that controls the effect the "play-distance" of a play-item pair has on the play-item pair's pairwise synergy score. In this context, "play-distance" refers to the number of turns that occurred between when the play-items in the play-item pair were played in a game. Thus, a game in which a player plays play-item A on turn 1 and plays play-item B on turn 2 would have a low play-distance for the play-item pair (A, B). On the other hand, a game in which a player plays play-item A on turn 1 and plays play-item B on turn 12 would have a high play-distance for the play-item pair (A,B).

As illustrated in FIG. 1, the formula calculating pairwise synergy scores includes a play-distance coefficient that controls how much a play-item pair contributes to a win as the play-items in the pair are played on turns $t_i$ and $t_j$, respectively. This weight may be adjusted to favor play-item pairs that have low play-distances (e.g. a=0.4), to favor play-item pairs that have high play-distances (e.g. a=5), or to be neutral relative to the play-distance of the play-item pair (e.g. a=1).

For example, selecting a play-distance coefficient that favors low play-distances will increase the pairwise synergy scores of play-item pairs that were played on turns that were near each other (e.g. turns 3 and 4), and will decrease the pairwise synergy scores of play-item pairs that were played on turns that were further apart (e.g. played on turns 2 and 10). Conversely, selecting a play-distance coefficient that favors high play-distances will decrease the pairwise synergy scores of play-item pairs that were played on turns that were near each other, and will increase the pairwise synergy scores of play-item pairs that were played on turns that were far apart.

According to one embodiment, multiple pairwise synergy scores may be generated for each play-item pair, where the different pairwise synergy scores for any given play-item pair are generated using different play-distance coefficients.

For example, a play-item pair in which the play-items have similar play-costs may have the following pairwise synergy scores:
- a low play-distance pairwise synergy score of 20 (calculated using a play-distance coefficient that favors low play-distances)
- a neutral play-distance pairwise synergy score of 10 (calculated using a neutral play-distance coefficient)
- a high play-distance pairwise synergy score of 2 (calculated using a play-distance coefficient that favors high play-distances)

On the other hand, a play-item pair in which the play-items have vastly different play-costs may have the following pairwise synergy scores:
- a low play-distance pairwise synergy score of 3 (calculated using a play-distance coefficient that favors low play-distances)
- a neutral play-distance pairwise synergy score of 13 (calculated using a neutral play-distance coefficient)
- a high play-distance pairwise synergy score of 24 (calculated using a play-distance coefficient that favors high play-distances)

As shall be explained in greater detail hereafter, the different pairwise synergy scores may be used to generate different bundle-wise synergy scores. For example, each bundle may be assigned three different bundle-wise efficiency scores: a low play-distance bundle-wise synergy score (based on the low play-distance pairwise synergy scores), a neutral play-distance bunder-wise synergy score (based on the neutral pairwise synergy scores), and a high play-distance bundle-wise synergy score (based on the high play-distance pairwise synergy scores).

Bundle-Wise Synergy Scores

A bundle-wise synergy score indicates the synergy level between all play-items in a bundle. For bundles that only have two play-items, the pairwise synergy scores may be used as the bundle-wise synergy scores. For bundles that include more than two play-items, the pairwise synergy scores for each distinct pair of play-items within the bundle may be used to calculate bundle-wise synergy scores.

Figure 3:
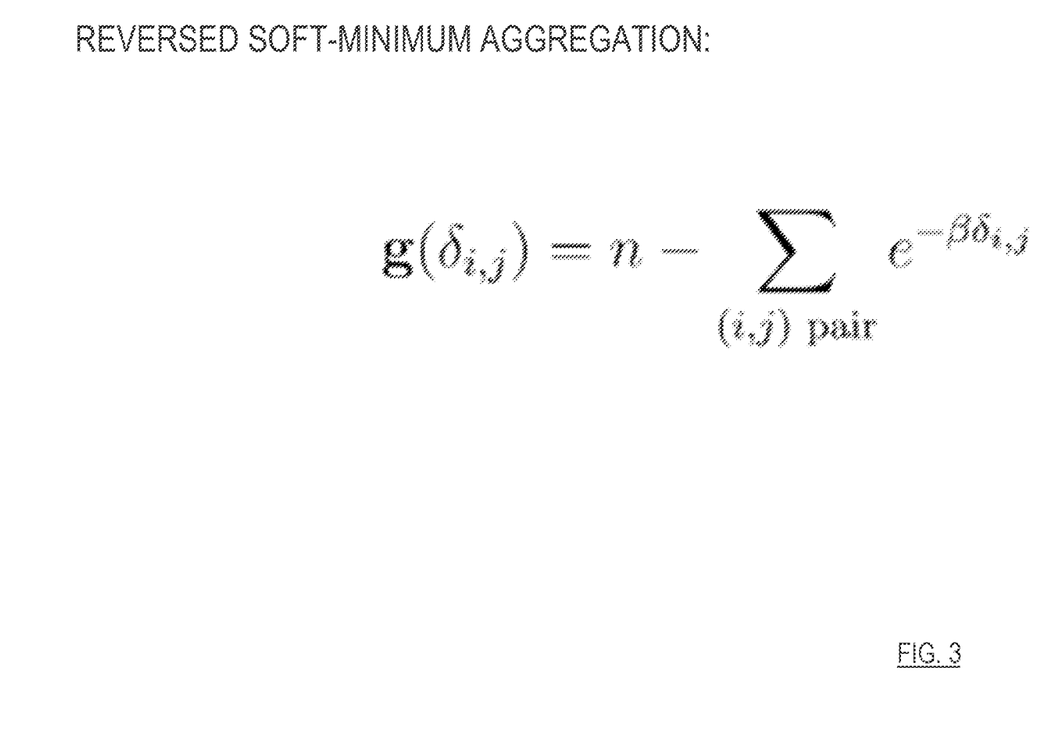
FIG. 3 illustrates a reversed soft-minimum aggregation equation that may be used to generate bundle-wise synergy scores for the bundles, according to an embodiment.

According to one embodiment, bundles of N play-items are created for each combination of N play-items that can legally be included in the same game-set. Once the bundles are created, the bundle-wise synergy scores for the bundles are generated using the reversed soft-minimum aggregation equation illustrated in FIG. 3. In one embodiment, the beta value of this equation is always positive, and is dependent on the play-distance coefficient.

Figure 4:
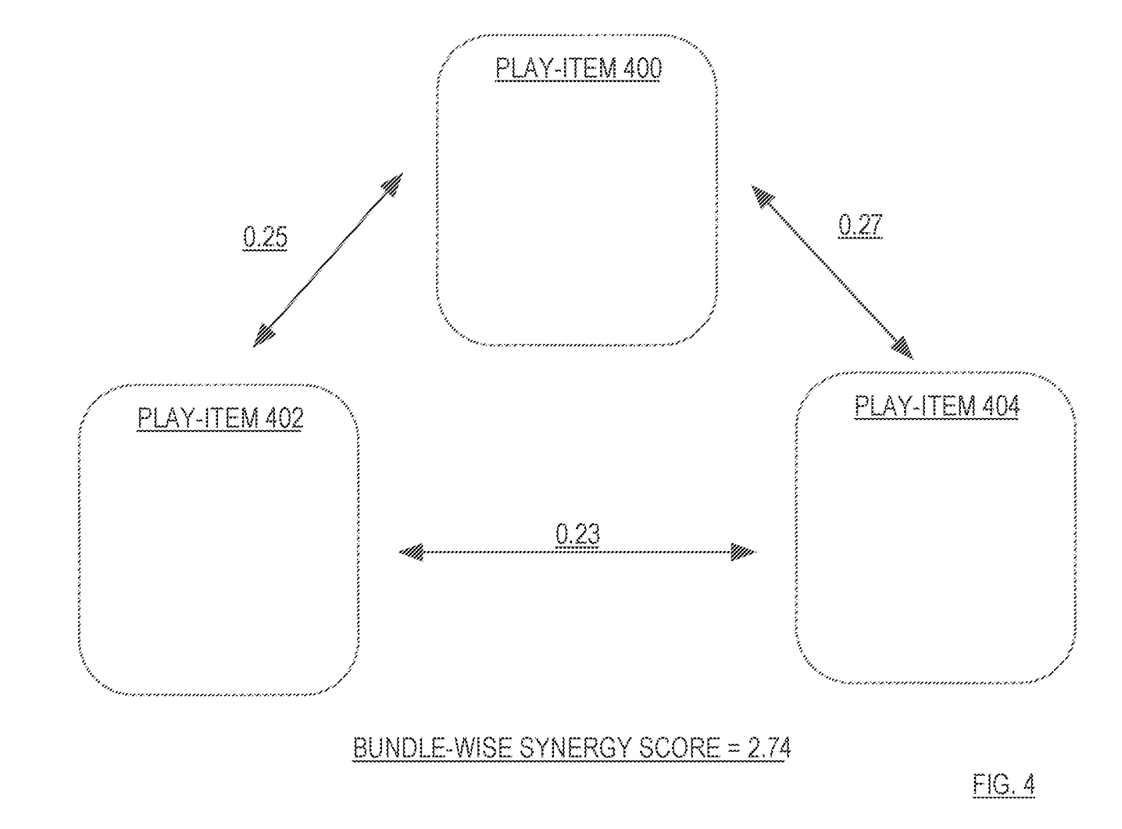
FIG. 4 is a block diagram that illustrates a bundle with three play-items, according to one embodiment.

Referring to FIG. 4, it is a block diagram that illustrates a bundle with three play-items 400, 402 and 404. In this example, the pairwise synergy between play-item 400 and play-item 402 is 0.25. The pairwise synergy between play-item 402 and play-item 404 is 0.23. The pairwise synergy between play-item 400 and play-item 404 is 0.27. Using these pairwise synergy scores as input to the reversed soft-minimum aggregation function illustrated in FIG. 3 produces the bundle-wise synergy score of 2.74.

Bundle-to-Game-Set Synergy Scores

Once bundles of play-items have been created and assigned bundle-wise synergy scores, the issue becomes which of the pre-constructed bundles to offer to a given user. The need to identify the bundles to offer to a play may arise, for example, when rewarding the player by allowing the player to supplement their game-set with play-items from one or more reward bundles. One approach to offering reward bundles to a player is to allow the player to select from among all pre-constructed bundles that:

- have relatively high bundle-wise synergy scores (referred to herein as the "high-bundle-synergy bundles"); and
- can be legally added to the player's game-set Unfortunately, there may be a very high number of high-bundle-synergy bundles that can be legally added to a player's game-set. Further, while the high-bundle-synergy bundles generally have play-items that work well together, there is no guarantee that adding those play-items to a player's specific game-set will improve the game-set. Therefore, according to one embodiment, for each high-bundle-synergy bundle, a bundle-to-game-set score is generated. The bundle-to-game-set score of a bundle reflects the synergy between the bundle and the play-items in the player's game-set.

Once the bundle-to-game-set synergy scores have been determined, then a player may be rewarded by either:
- automatically select the reward bundle(s) for the player based on the bundle-to-game-set synergy scores, or
- filtering the high-bundle-synergy bundles down to a relatively small set of candidate reward bundles based on the bundle-to-game-set synergy scores. Once the relatively small set of candidate reward bundles are identified, the candidate bundles may be presented to the player to enable to player to select the player's reward bundle(s).

Whether the reward bundle(s) are selected automatically, or the user is allowed to choose reward bundle(s) from a candidate set of bundles, it is important that the abilities of the play-items in the reward bundle(s) have high synergies with the abilities of the play-items in the player's existing game-specific set. Therefore, in either case, the bundles awarded or presented to the player are those high-bundle-synergy bundles with relatively high bundle-to-game-set synergy scores.

According to one embodiment, the bundle-to-game-set synergy scores may be generated using reversed soft-minimum aggregation in a manner similar to the generation of bundle-wise synergy scores described above. However, while the bundle-wise synergy scores are based on the pairwise synergy scores between each pair of play-items in the bundle, the bundle-to-game-set synergy scores are based on the pairwise synergy scores between the pairs created by pairing each play-item in the bundle with each play-item in the game set. Thus, if the bundle includes 3 play-items, and the player's game-set includes 30 play-items, then the bundle-to-game-set synergy score is generated based on 90 pairwise synergy scores.

Normalization of Bundle-to-Game-Set Synergy Scores

In some games, the number of play-items in a player's game-set may vary. In such cases, the size of a player's game-set may affect the bundle-to-get-set synergy score. For example, if a bundle has approximately the same degree of infinity to game-sets A and B, the bundle-to-game-set synergy score between that bundle and game-set A may be higher than the bundle-to-game-set synergy score between that bundle and game-set B simply because game-set A has more play-items than game-set B. Therefore, in one embodiment, the bundle-to-game-set synergy scores are normalized to account for the effects of game-sets having different numbers of play-items.

Cost-Curve Adjustment

As mentioned above, in many games, different play-items have different play-costs. The "cost-curve" of a game-set is dictated by the play-costs of the play-items in the game-set. For example, a game-set with a high number of low-cost play-items is considered to have a low cost-curve. On the other hand, a game-set with a high number of high-cost play-items is considered to have a high cost-curve.

According to one embodiment, the sampled gameplay data is used to (a) identify the "most successful" game-sets, and (b) determine a "target cost-curve" based on those most successful game-sets. For example, based on the sampled gameplay data from those game-sets that were used in at least 20 games, the N game-sets with the highest win/loss ratio may be selected. The cost-curve of each of those N game-sets may be determined based on the play-items contained therein. Those cost-curves may then be aggregated to find the "target" cost-curve. The target cost-curve may be, for example, the mean, median, or mode, cost-curve of those most successful game-sets.

In some games, there may be distinct categories of play-items, where any given game-set may be limited to play-items from a subset of the categories. Under these circumstances, a distinct target cost-curve may be generated for each category of play-items. For example, assume that there are five categories C1, C2, C3, C4 and C5 of play-items, and that any given game-set can only include play-items from one of those categories. In this example, the N most successful game-sets having play-items from category C1 would be used to determine a target cost-curve for category C1. Similarly, the N most successful game-sets having play-items from category C2 would be used to determine a target cost-curve for category C2, etc.

According to one embodiment, a cost-curve adjustment may be applied to each bundle-to-game-set score based on whether adding the play-items in the bundle to the game-set will make the cost-curve of the game-set closer to or further from the target cost-curve that applies to the game-set. For example, assume that:

a game-set has play-items from category C1 and a cost-curve of X, and the target cost-curve for category C1 is Y.

In these circumstances, a bundle whose addition to the game-set would cause the cost-curve of the game-set to be closer to curve Y would receive a cost-curve adjustment that increases the bundle-to-game-set score of the bundle/game-set combination. On the other hand, a bundle whose addition to the game-set would cause the cost-curve of the game-set to be further from curve Y would receive a cost-curve adjustment that decreases the bundle-to-game-set score of the bundle/game-set combination.

Duplicate-Item Penalty

In some cases, play-items may have high pair-wise synergies with themselves. In such cases, a game-set that has many instances of the same play-item may work quite well. However, such game-sets are often found to be "overpowered" or "boring". Consequently, many games have rules that limit the number times the same play-item may be present in a game set. While a game may or may not suspend those limits in situations where the player is supplementing their game-set with play-items from a reward bundle, it may still be desirable to discourage play-item duplication within game-sets.

Therefore, according to one embodiment, a "duplicate-item penalty" may be added to the formulas for generating pairwise synergy scores, bundle-wise synergy scores, and/or bundle-to-game-set synergy scores. Such a penalty educes the score based on play-item duplication. For example, the pairwise synergy scores between each play-item and itself may be reduced relative to what the score would otherwise be without a duplicate-item penalty. Similarly, the bundle-wise synergy score of bundles that have multiple occurrences of the same play-item may be reduced. Finally, the bundle-to-game-set synergy score for a particular bundle/game-set combination may be reduced in situations where the bundle includes one or more play-items that are already present in the game-set.

According to one embodiment, the magnitude of the duplicate-item penalty is an adjustable parameter. Thus, when the duplicate-item penalty parameter is assigned a low value, the high-scoring pre-constructed bundles are more likely to have duplicated play-items and/or the bundles rewarded to a player are more likely to have play-items that duplicate play-items that are already in that player's game-set. On the other hand, when the duplicate-item penalty parameter is assigned a high value, the high-scoring pre-constructed bundles are less likely to have duplicated play-items and/or the bundles rewarded to a player are less likely to have play-items that duplicate play-items that are already in that player's game-set.

Randomizing Selection of Candidate Bundles

When presenting N candidate bundles to a player that has a particular game-set, the system may generate bundle-to-game-set scores for each bundle using the techniques described above, and then present the player with the top-N bundles (the N bundles having the highest bundle-to-game-set scores). However, always selecting the bundles with the top-N bundle-to-game-set synergy scores may not be ideal, since it allows for little variation. That is, given a particular game-set, a player may be presented with the same candidate bundles every time.

To allow greater variation, the bundles with the top-N bundle-to-game-set synergy scores are not automatically selected as candidates for presentation. Rather, a randomization factor applied to the bundle-to-game-set synergy scores to produce "randomized synergy scores". The randomization factor is applied such that bundles with high bundle-to-game-set synergy scores are more likely to have high randomized synergy scores, but it is not guaranteed. Once the randomized synergy scores have been generated for each bundle, the bundles with the top-N randomized synergy scores are selected for presentation to the player.

Various techniques may be used to generate randomized synergy scores for the bundle-to-game-set synergy scores, and the techniques described herein are not limited to any particular randomization technique. Examples of randomization techniques include:

randomized synergy score=(bundle-to-game-set synergy score)+(randomly generated number within range [x,y]), or randomized synergy score=(bundle-to-game-set synergy score)*(randomly generated number within range [x,y])

In both of these examples, if a bundle X has a higher bundle-to-game-set synergy score than bundle Y, then bundle X is more likely than not to have a higher randomized synergy score than bundle Y. However, depending on the random number generated, bundle Y may sometimes have a higher randomized synergy score than bundle X.

According to one embodiment, the randomized synergy score for a given bundle/game-set combination takes into account numerous factors, including:

the synergy between the play-items in the bundle and the play-items in the game-set any cost-curve adjustment any duplicate-item penalty a randomization factor One way of selecting the N bundles to reward or present to a player involves ranking all bundles based on their calculated randomized synergy scores, and then rewarding/ presenting those bundles with the top N randomized synergy scores. Because of the randomization factor, those top N bundles will not always be the same for any given game-set. However, since the randomized synergy scores are based on the bundle-to-game-set synergy score and the cost-curve adjustment, the top N bundles are likely to contain play-items that will improve the game-set of the player.

Using the Play-Distance Coefficient for Bundle Selection

As explained above, adjusting the play-distance coefficient changes pairwise synergy score for a pair of play-items based on the difference in play-cost of the play-items. The play-distance coefficient may be set to favor play-items with similar play-costs, to favor play-items with significantly different play-costs, or to be neutral relative to the difference in play costs.

Because both bundle-wise synergy scores and bundle-to-game-set synergy scores are based on pairwise synergy scores, both bundle-wise synergy scores and bundle-to-game-set synergy scores will also be affected by changes in the play-distance coefficient used to generate the pairwise synergy scores. According to one embodiment, when selecting N bundles to reward or offer to a player, bundle diversity is achieved by:

selecting the top N/3 bundles whose scores were generated using a play-distance coefficient that favors low play-distances, selecting the top N/3 bundles whose scores were generated using a play-distance coefficient that favors play-distances, and selecting the top N/3 bundles whose scores were generated using a play-distance coefficient that is neutral relative to play-distance.

Figure 5:
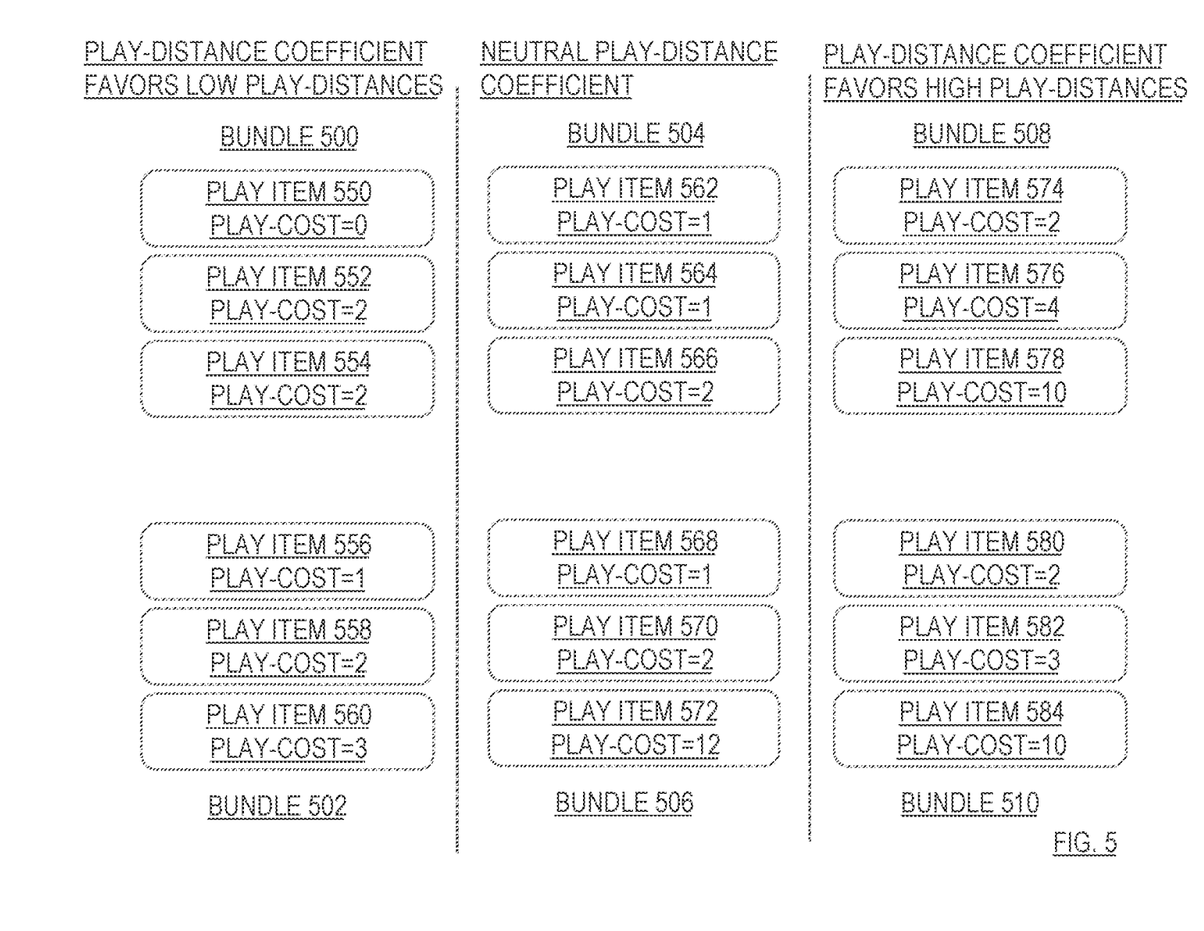
FIG. 5 is a block diagram that illustrates a scenario where six bundles are presented to a player to enable the player to select a reward bundle.

Referring to FIG. 5, it is a block diagram that illustrates a scenario where six bundles are presented to a player to enable the player to select a reward bundle. The first two bundles 500 and 502 are the two bundles with the highest randomized selection scores where the pairwise synergy scores and/or bundle-wise synergy scores were generated using a play-distance coefficient that favors low play-distances. As a result of using a play-distance coefficient that favors low play-distances, the range of play-costs of the play-items in each of bundles 500 and 502 is narrow.

The second two bundles 504 and 506 are the two bundles with the highest randomized selection scores where the pairwise synergy scores and/or bundle-wise synergy scores were generated using a play-distance coefficient that is neutral relative to play-distances. As a result of using a neutral play-distance coefficient, the top two bundles include one bundle 504 with a narrow range of play-distances, and another bundle 506 with wide range of play-distances.

The third two bundles 508 and 510 are the two bundles with the highest randomized selection scores where the pairwise synergy scores and/or bundle-wise synergy scores were generated using a play-distance coefficient that favors high play-distances. As a result of using a play-distance coefficient that favors high play-distances, there the range of the play-costs of the play-items in each of bundles 508 and 510 is wide.

Non-Synergistic Factors

In some cases, it is desirable to reward/present bundles that take into account factors that are not directly related to synergy. The mana-curve adjustment and duplicate-item penalties described above are two examples of non-synergistic factors upon which bundle selection may be based. In some embodiments, other non-synergistic factors may be used. For example, to promote use of a set of play-items that has been recently introduced into the game (play-items that belong to a new "expansion"), a recency-based adjustment may used when generating the various scores upon which bundle construction and/or selection is based. A recency-based adjustment may, for example, reduce the synergy scores when older play-items are involved, and increase the synergy scores when recently-release play-items are involved.

As another example, a rare-use adjustment may be made to increase the scores for bundles that contain rarely-used cards. Such an adjustment may be particularly useful in situations where a play-item is used so infrequently that it is not possible to generate accurate pairwise synergy scores for pairs that include the card due to lack of relevant data points in the sampled gameplay data.

In some embodiments, non-synergistic factors may be used as filter criteria, rather than to merely adjust scores. For example, rather than increase the synergy scores of pairs or bundles that include play-items for a recent expansion, the system may exclude from consideration all play-items that do not belong to certain recent expansions. Consequently, all bundles that are constructed and scored will contain only play-items from those recent expansions. Similarly, rather than apply a duplicate-item penalty, an online game system have be programmed to only generate and score bundles that have no duplicate play-items.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
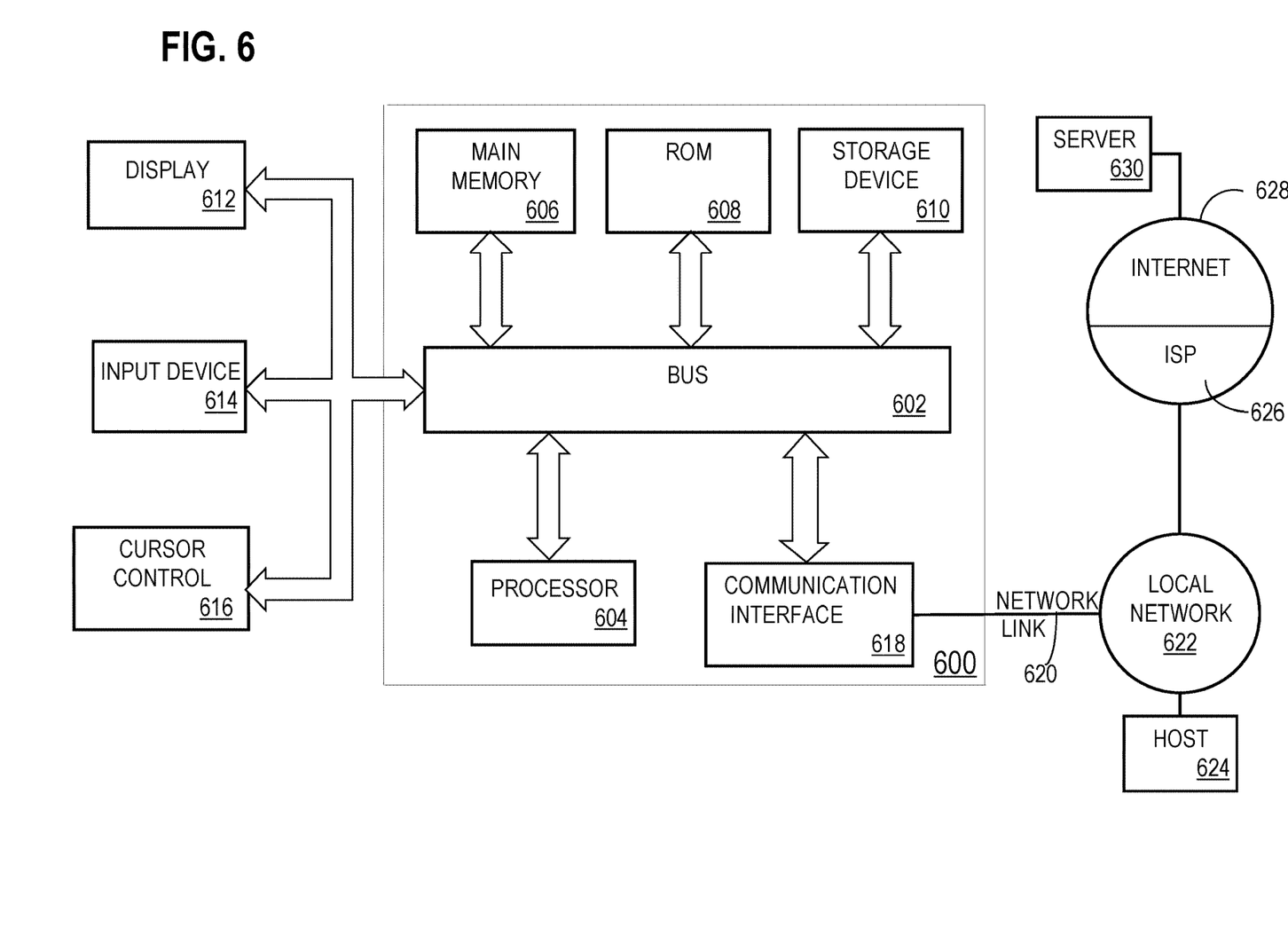
FIG. 6 is a block diagram that illustrates a computing device upon which embodiments may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    obtaining sampled gameplay data that identifies play-items included in game-sets that were used in a plurality of previously-played games;
    for each play-item pair of a plurality of play-item pairs, generating a pairwise synergy score based at least in part on inclusion of the play-items that belong to the play-item pair in game-sets that were used in a count of the plurality of previously-played games that exceeds a threshold;
    constructing a plurality of bundles of play-items;
    assigning each bundle of the plurality of bundles a bundle-wise synergy score that is based, at least in part, on the pairwise synergy scores for each pair of play-items that is included in the bundle;

from the plurality of bundles, determining a candidate set of bundles based, at least in part, on the bundle-wise synergy scores assigned to the bundles;

wherein the method is performed by one or more computing devices; and either rewarding a player with play-items from at least one bundle in the candidate set of bundles; or presenting the player with the candidate set of bundles to enable the player to select one or more of the bundles from the candidate set of bundles.

2. The method of claim 1 further comprising calculating the bundle-wise synergy score of each bundle of the plurality of bundles using a reversed soft-minimum aggregation.

3. The method of claim 1 wherein:

the sampled gameplay data includes outcome data that indicates outcomes of the plurality of previously-played games; and the pairwise synergy score for each play-item pair is further based on outcomes of games, from the plurality of previously-played games, in which a game-set included the play-items that belong to the play-item pair.

4. The method of claim 3 wherein the pairwise synergy score for each play-item pair is based, at least in part, on a win-rate factor for games in which a game-set included the play-items that belong to the play-item pair.

5. The method of claim 1 further comprising generating the sampled gameplay data by:

obtaining initial gameplay data from a set of previously-played games; and generating the sampled gameplay data by filtering out of the initial gameplay data all data relating to a subset of games;

wherein the subset of games includes one or more of:

games involving a player with a skill level score below a threshold; or games involving players whose skill levels differ by more than a predetermined amount.

6. The method of claim 1 wherein the pairwise synergy score for each pair of play-items is based, at least in part, on a value of a play-distance coefficient.

7. The method of claim 1 further comprising generating a plurality of pairwise synergy scores for each play-item pair of the plurality of play-item pairs, wherein the plurality of pairwise synergy scores generated for each play-item pair includes:

a first pairwise synergy score that is generated based on a first value of a play-distance coefficient; and a second pairwise synergy score that is generated based on second value of the play-distance coefficient;

wherein the first value is different from the second value.

8. The method of claim 7 wherein determining the candidate set of bundles includes:

determining one or more bundles to include in the candidate set based on pairwise synergy scores generated based on the first value of the play-distance coefficient; and determining one or more bundles to include in the candidate set based on pairwise synergy scores generated based on the second value of the play-distance coefficient.

9. The method of claim 1 wherein determining the candidate set of bundles includes:

for each bundle in the plurality of bundles, determining a bundle-to-game-set synergy score based on the pairwise synergy scores between play-items in the bundle and play-items in a particular game-set; and determining the candidate set of bundles based, at least in part, on the bundle-to-game-set synergy scores assigned to the plurality of bundles.

10. The method of claim 9 further comprising:

determining a target cost-curve for the particular game-set, and applying a cost-curve adjustment to the bundle-to-game-set synergy score of each bundle in the plurality of bundles based, at least in part, on whether adding the play-items in the bundle to the particular game-set will cause the particular game-set to have a cost-curve that is closer to the target cost-curve.

11. The method of claim 9 further comprising applying a duplicate-item penalty to the bundle-to-game-set synergy score of each bundle in the plurality of bundles based, at least in part, on whether adding the play-items in the bundle to the particular game-set will cause the particular game-set to have duplicate play-items.

12. The method of claim 1 further comprising applying a duplicate-item penalty to the pairwise synergy scores of play-item pairs that include duplicate play-items.

13. The method of claim 1 further comprising applying a duplicate-item penalty to the bundle-wise synergy scores of bundles that include duplicate play-items.

14. One or more non-transitory computer-readable media storing instructions which, when executed by one or more computing devices, cause:

obtaining sampled gameplay data that identifies play-items included in game-sets that were used in a plurality of previously-played games;

for each play-item pair of a plurality of play-item pairs, generating a pairwise synergy score based at least in part on inclusion of the play-items that belong to the play-item pair in game-sets that were used in a count of the plurality of previously-played games that exceeds a threshold;

constructing a plurality of bundles of play-items;

assigning each bundle of the plurality of bundles a bundle-wise synergy score that is based, at least in part, on the pairwise synergy scores for each pair of play-items that is included in the bundle;

from the plurality of bundles, determining a candidate set of bundles based, at least in part, on the bundle-wise synergy scores assigned to the bundles; and either rewarding a player with play-items from at least one bundle in the candidate set of bundles; or presenting the player with the candidate set of bundles to enable the player to select one or more of the bundles from the candidate set of bundles.

15. The one or more non-transitory computer-readable media of claim 14 wherein:

the sampled gameplay data includes outcome data that indicates outcomes of the plurality of previously-played games; and the pairwise synergy score for each play-item pair is further based on outcomes of games, from the plurality of previously-played games, in which a game-set included the play-items that belong to the play-item pair.

16. The one or more non-transitory computer-readable media of claim 15 wherein the pairwise synergy score for each play-item pair is based, at least in part, on a win-rate factor for games in which a game-set included the play-items that belong to the play-item pair.

17. The one or more non-transitory computer-readable media of claim 14 wherein the pairwise synergy score for each pair of play-items is based, at least in part, on a value of a play-distance coefficient.

18. The one or more non-transitory computer-readable media of claim 14 wherein the instructions further cause generating a plurality of pairwise synergy scores for each play-item pair of the plurality of play-item pairs, wherein the plurality of pairwise synergy scores generated for each play-item pair includes:
   a first pairwise synergy score that is generated based on a first value of a play-distance coefficient; and
   a second pairwise synergy score that is generated based on second value of the play-distance coefficient;
   wherein the first value is different from the second value.

19. The one or more non-transitory computer-readable media of claim 18 wherein determining the candidate set of bundles includes:
   determining one or more bundles to include in the candidate set based on pairwise synergy scores generated based on the first value of the play-distance coefficient; and
   determining one or more bundles to include in the candidate set based on pairwise synergy scores generated based on the second value of the play-distance coefficient.

20. The one or more non-transitory computer-readable media of claim 14 wherein determining the candidate set of bundles includes:
   for each bundle in the plurality of bundles, determining a bundle-to-game-set synergy score based on the pairwise synergy scores between play-items in the bundle and play-items in a particular game-set; and
   determining the candidate set of bundles based, at least in part, on the bundle-to-game-set synergy scores assigned to the plurality of bundles.

21. The one or more non-transitory computer-readable media of claim 20 wherein the instructions further cause:
   determining a target cost-curve for the particular game-set, and
   applying a cost-curve adjustment to the bundle-to-game-set synergy score of each bundle in the plurality of bundles based, at least in part, on whether adding the play-items in the bundle to the particular game-set will cause the particular game-set to have a cost-curve that is closer to the target cost-curve.

\* \* \* \* \*